US010277572B2

(12) United States Patent
Spencer et al.

(10) Patent No.: US 10,277,572 B2
(45) Date of Patent: *Apr. 30, 2019

(54) PROVISIONING ENTERPRISE SERVICES PROVIDED BY AN INFRASTRUCTURE SERVICE SERVER

(71) Applicant: BlackBerry Limited, Waterloo (CA)

(72) Inventors: Mendel Elliot Spencer, Ottawa (CA); Kirk Douglas Smith, Ottawa (CA); David Brian Seel, Ottawa (CA); Robert Lorne Bowerman, Waterloo (CA); Aleksandar Susnjar, Markham (CA); Calin Marius Bozsitz, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 155 days.

This patent is subject to a terminal disclaimer.

(21) Appl. No.: 15/096,677

(22) Filed: Apr. 12, 2016

(65) Prior Publication Data
US 2017/0295156 A1 Oct. 12, 2017

(51) Int. Cl.
*H04L 29/06* (2006.01)
*H04W 4/50* (2018.01)
*H04L 12/24* (2006.01)

(52) U.S. Cl.
CPC .......... *H04L 63/08* (2013.01); *H04L 41/0806* (2013.01); *H04L 41/5041* (2013.01);
(Continued)

(58) Field of Classification Search
None
See application file for complete search history.

(56) References Cited

U.S. PATENT DOCUMENTS

| 8,566,917 | B2 * | 10/2013 | Vangpat | H04L 63/0815 |
| | | | | 726/8 |
| 2008/0260119 | A1 * | 10/2008 | Marathe | H04M 7/125 |
| | | | | 379/93.01 |

(Continued)

FOREIGN PATENT DOCUMENTS

WO 2015/173517 11/2015

OTHER PUBLICATIONS

Extended European Search Report issued in European Application No. 17166171.3 dated Jun. 21, 2017; 9 pages.
(Continued)

*Primary Examiner* — Farid Homayounmehr
*Assistant Examiner* — Olanrewaju J. Bucknor
(74) *Attorney, Agent, or Firm* — Fish & Richardson P.C.

(57) ABSTRACT

Systems, methods, and software can be used to share content. In some aspect, an enterprise mobility management (EMM) server receives a command for provisioning a user for an enterprise service at an identity provider (IDP). The EMM server sends a user provisioning request to the IDP. The user provisioning request includes a user identity attribute and a user entitlement attribute, the user identity attribute identifies the user, and the user entitlement attribute indicates an access level associated with the user for the enterprise service. The EMM server receives a user provisioning response from the IDP. The user provisioning response indicates that the user is provisioned at the IDP for the enterprise service.

14 Claims, 5 Drawing Sheets

(52) U.S. Cl.
CPC ........ *H04L 63/083* (2013.01); *H04L 63/0823* (2013.01); *H04L 67/42* (2013.01); *H04W 4/50* (2018.02); *H04L 63/0815* (2013.01)

(56) References Cited

U.S. PATENT DOCUMENTS

| | | | | |
|---|---|---|---|---|
| 2011/0231919 | A1* | 9/2011 | Vangpat | H04L 63/0815 726/8 |
| 2012/0144034 | A1 | 6/2012 | McCarty | |
| 2012/0254957 | A1* | 10/2012 | Fork | G06F 21/33 726/6 |
| 2014/0040638 | A1* | 2/2014 | Barton | H04L 41/00 713/193 |
| 2015/0089497 | A1* | 3/2015 | Borzycki | G06F 21/53 718/1 |
| 2016/0219060 | A1* | 7/2016 | Karunakaran | G06F 21/33 |
| 2016/0308852 | A1* | 10/2016 | Coxe | H04L 63/0815 |
| 2016/0366120 | A1* | 12/2016 | Rykowski | H04L 63/0815 |
| 2017/0070498 | A1* | 3/2017 | Fork | G06F 21/33 |
| 2017/0126661 | A1* | 5/2017 | Brannon | H04L 63/0815 |
| 2017/0155640 | A1* | 6/2017 | Rykowski | H04L 63/0815 |
| 2017/0288883 | A1* | 10/2017 | Goverdhan | G06F 17/30607 |
| 2017/0331815 | A1* | 11/2017 | Pawar | H04L 63/0823 |
| 2017/0346853 | A1* | 11/2017 | Wyatt | H04L 43/12 |

OTHER PUBLICATIONS

Communication pursuant to Article 94(3) EPC issued in European Application No. 17166171.3 dated May 14, 2018, 8 pages.
Communication pursuant to Article 94(3)EPC issued in European Application No. 17166171.3 dated Sep. 25, 2018, 5 pages.
Communication pursuant to Article 94(3) EPC issued in European Application No. 17166171.3 dated Feb. 12, 2019, 4 pages.

* cited by examiner

PROVISIONING ENTERPRISE SERVICES PROVIDED BY AN INFRASTRUCTURE SERVICE SERVER

BACKGROUND

The present disclosure relates to provisioning an enterprise service. In some cases, access to an enterprise service may be restricted. For example, an enterprise may limit the access to the enterprise service to the employees, customers, or other associates of the employee. In some cases, an administrator of the enterprise may provision the enterprise services based on the restrictions set by the enterprise.

DESCRIPTION OF DRAWINGS

Like reference numbers and designations in the various drawings indicate like elements.

DETAILED DESCRIPTION

In some cases, an enterprise can use an enterprise mobility management (EMM) server to manage applications and devices for an enterprise. For example, the EMM server can also manage the electronic devices of the users associated with the enterprise. The EMM server can install, update, and delete client applications operating on the electronic devices for an enterprise service. In some cases, the EMM server can be located on-premise at the enterprise.

In some cases, an enterprise can use an infrastructure service server to provide infrastructure service for the enterprise. Examples of the infrastructure service server include an identity provider (IDP). The IDP can be configured to authenticate a user before the user is granted access to an enterprise service provided by a service provider. Therefore, an administrator of an enterprise may provision a user for an enterprise service at the IDP before the user can access the enterprise service. In some cases, the provisioning process includes sending entitlement information of the user for the enterprise service at the IDP. The entitlement information can indicate the user's access level to the enterprise service. The IDP can enforce the entitlement when the IDP authenticates the user.

In some cases, the infrastructure service server can be located in a cloud computing platform. Therefore, an administrator may need to access the EMM server and the infrastructure service server separately to complete the setup of an enterprise service for a user. In addition, because the infrastructure service server is located in a cloud computing platform, the administrator may use complicated security procedures to establish a secure communication channel with the infrastructure service server.

In some cases, a trust relationship can be established between the infrastructure service server and the EMM server. Therefore, an administrator can use the on-premise EMM server to provision an enterprise service at the infrastructure service server, in a cloud computing platform. FIGS. 1-7 and associated descriptions provide additional details of these implementations.

Figure 1:
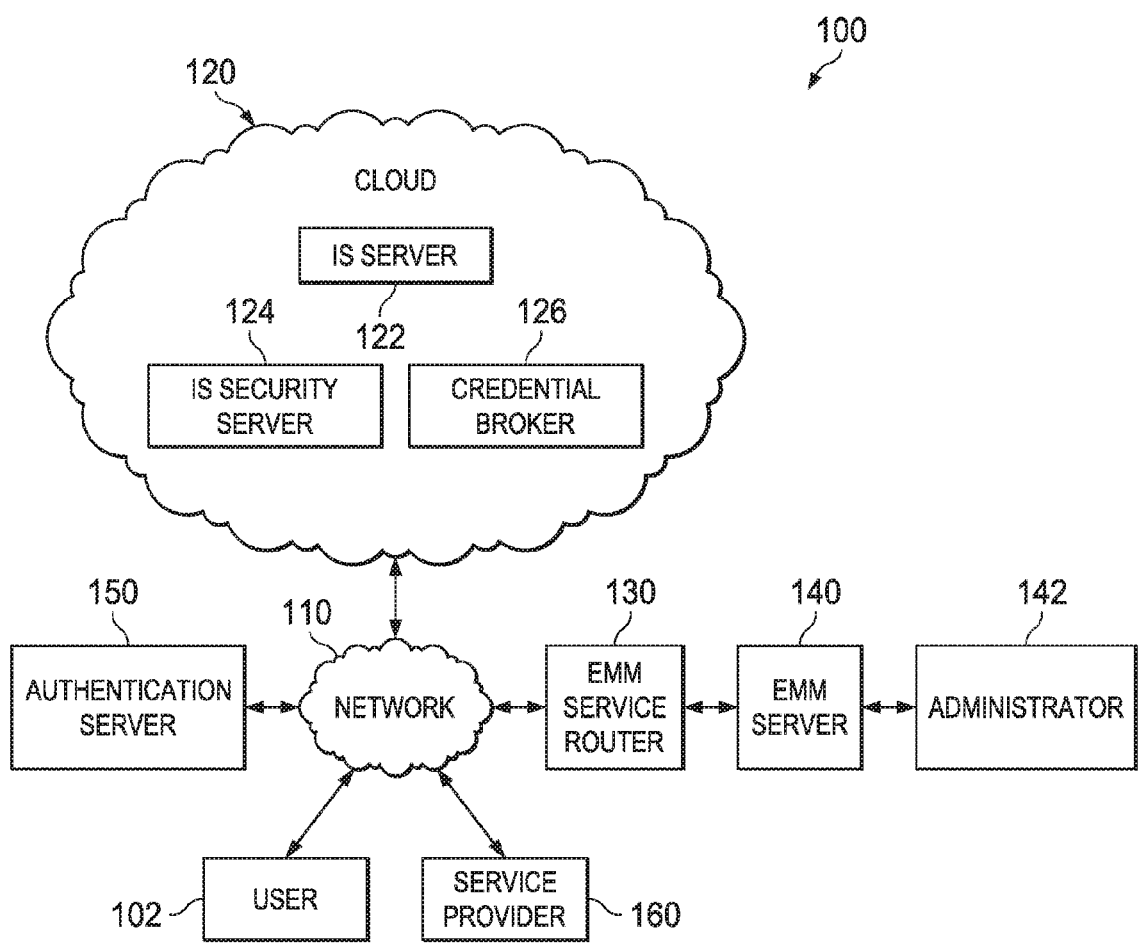
FIG. 1 is a schematic diagram showing an example communication system that provisions enterprise services.

FIG. 1 is a schematic diagram showing an example communication system 100 that provisions enterprise services. At a high level, the example communication system 100 includes an enterprise mobility management (EMM) server 140 that is communicatively coupled with an administrator 142 and a network 110 through an EMM service router 130. The example communication system 100 also includes a user 102, a service provider 160, and a cloud 120 that are communicatively coupled with the network 110.

Figure 5:
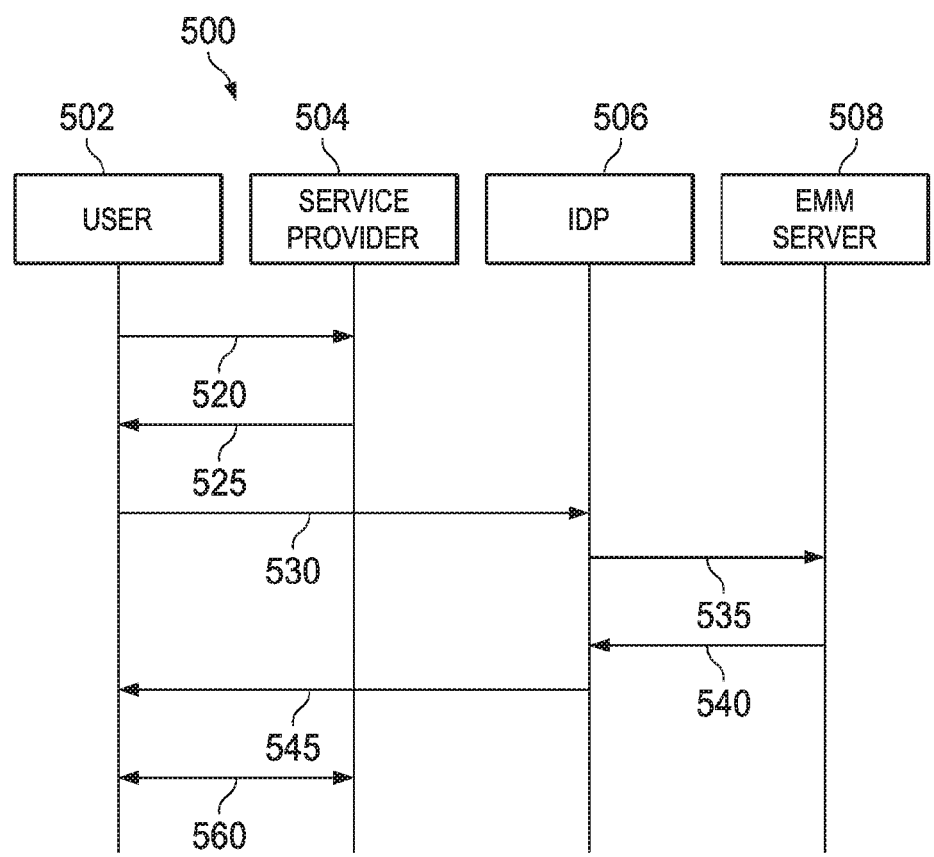
FIG. 5 is a flow diagram showing an example process for a user to access an enterprise service according to an implementation.

The service provider 160 represents an application, a set of applications, software, software modules, hardware, or any combination thereof that can be configured to provide enterprise services. The enterprise services can include access to enterprise resources, e.g., file systems, websites, portals. The enterprise services can also include services that are provided using enterprise applications, e.g., email, messaging, file sharing, or other applications. In some cases, access to enterprise services can be granted to users that are authenticated. FIG. 5 and associated descriptions provide additional details of these implementations.

The EMM server 140 represents an application, a set of applications, software, software modules, hardware, or any combination thereof that can be configured to manage applications and devices for an enterprise. For example, the EMM server 140 can install, update, and manage the license of enterprise applications. In some cases, the EMM server 140 can be located on the premise of the enterprise. In some cases, the EMM server 140 can be configured to provision an enterprise service in the cloud 120. FIGS. 2-7 and associated descriptions provide additional details of these implementations.

The administrator 142 represents an application, a set of applications, software, software modules, hardware, or any combination thereof that provisions an enterprise service. The administrator 142 and the EMM server 140 are associated with the same enterprise. In some cases, the administrator 142 can use the EMM server 140 to provision the enterprise service for the enterprise. In some cases, the administrator 142 can communicate with the EMM server 140, or other entities in the system 100, through an administration user interface. The administration user interface can include a browser, a client application, or a combination thereof.

The EMM service router 130 represents an application, a set of applications, software, software modules, hardware, or any combination thereof that can be configured to route data to and from the EMM server 140. In some cases, the EMM service router 130 can be implemented using a packet data router. In some cases, by using the EMM service router 130, the physical topology of the EMM server 140 can be obscured when communicating with other entities in the system 100. In some cases, the EMM server 140 can communicate with other entities in the system 100, through the network 110, without the EMM service router 130.

The user 102 represents an application, a set of applications, software, software modules, hardware, or any combination thereof that accesses an enterprise service at the service provider 160. In some cases, the user can use a client application, e.g., a browser or an enterprise service client operating on an electronic device to access other entities in the system 100.

Figure 2:
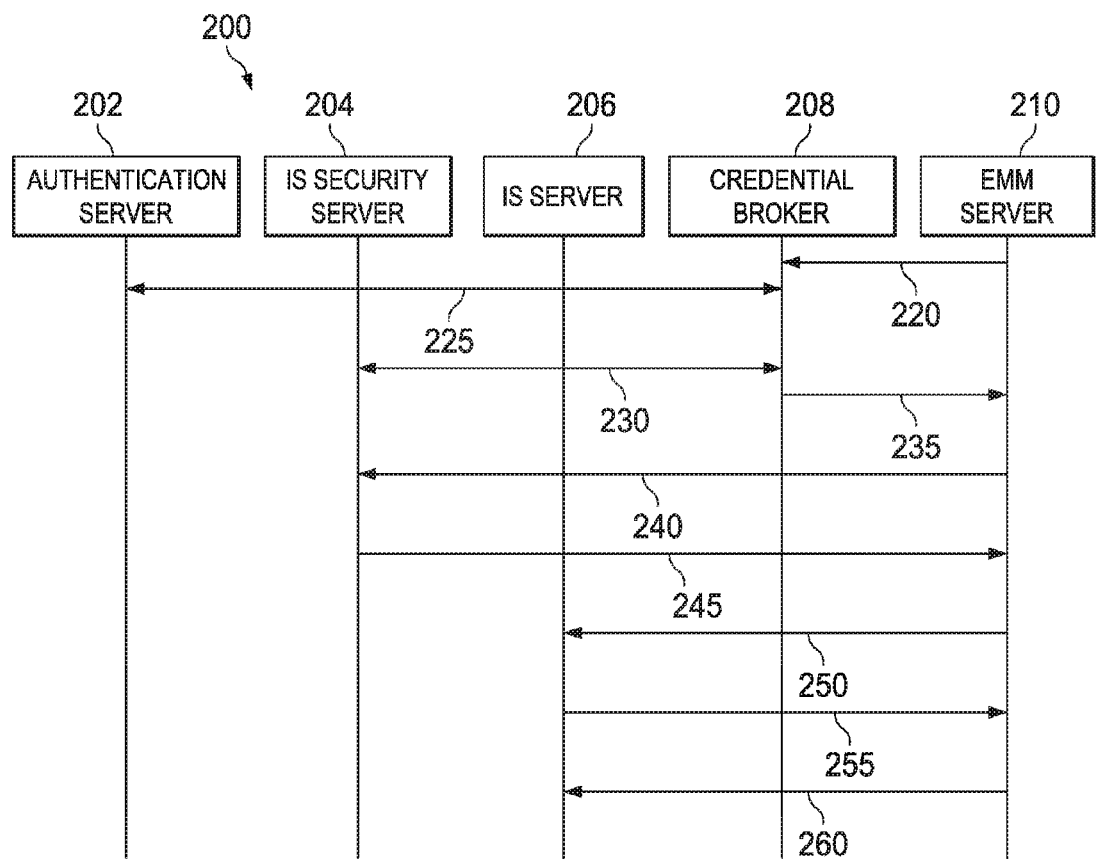
FIG. 2 is a flow diagram showing an example process for establishing a trust relationship between an infrastructure service server and an EMM server according to an implementation.

The security server 150 represents, an application, a set of applications, software, software modules, hardware, or any combination thereof that can be configured to perform authentication. In some cases, the security server 150 can be implemented using an authentication, authorization, and accounting (AAA) server. In some cases, the security server 150 can authenticate the EMM server 140 to establish a trust relationship between the EMM server and an infrastructure service server in the cloud 120. FIG. 2 and associated descriptions provide additional details of these implementations.

The cloud 120 represents a cloud computing platform that provides enterprise services. The cloud 120 can be implemented using one or more remote servers hosted on the Internet. In some cases, the cloud 120 can provide a shared pool of configurable computing resources, e.g., networks, servers, storage, applications and services, to the enterprise users.

As shown in FIG. 1, the cloud 120 includes an infrastructure service server 122. The infrastructure service server 122 represents an application, a set of applications, software, software modules, hardware, or combination thereof that can be configured to provide infrastructure service associated with an enterprise. Examples of the infrastructure service server 122 includes an identity provider (IDP) and a license management server. In some cases, the EMM server 140 can establish a trust relationship with the infrastructure service server 122, e.g., an IDP, and use the trust relationship to provision an enterprise service. FIGS. 2-7 and associated descriptions provide additional details of these implementations.

The cloud 120 also includes an infrastructure security server 124. The infrastructure security server 124 represents an application, a set of applications, software, software modules, hardware, or combination thereof that can be configured to provide security service for the infrastructure service server 122. For example, the infrastructure security server 124 can be a trusted Certificate Authority (CA) that can issue a client certificate to the EMM server 140 for the EMM server 140 to communicate with the infrastructure service server 122. FIG. 2 and associated descriptions provide additional details of these implementations. The infrastructure security server 124 can be implemented on the same or different hardware platform as the infrastructure service server 122.

The cloud 120 also includes a credential broker 126. The credential broker 126 represents an application, a set of applications, software, software modules, hardware, or combination thereof that can be configured to provide a credential translation for the EMM server 140. In some cases, a trust relationship between the credential broker 126 and the infrastructure security server 124 can be configured. For example, certificates can be configured and distributed to the credential broker 126 and the infrastructure security server 124, respectively. The certificates can be used to establish a secure communication channel between the credential broker 126 and the infrastructure security server 124. In some cases, the certificates can be configured manually. Because the credential broker 126 has a trust relationship with the infrastructure security server 124, the credential broker 126 can act as a broker to translate the credentials used by the EMM server 140 to the infrastructure service credential used by the infrastructure service server 122, and thereby establish a trust relationship between the EMM server 140 and the infrastructure service server 122. FIG. 2 and associated descriptions provide additional details of these implementations.

The example communication system 100 includes the network 110. The network 110 represents an application, set of applications, software, software modules, hardware, or combination thereof that can be configured to transmit data messages between the entities in the system 100. The network 110 includes a wireless network, a wireline network, or a combination thereof. For example, the network 110 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, or any other radio access technologies. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

Turning to a general description, an electronic device may include, without limitation, any of the following: computing device, mobile device, mobile electronic device, user device, mobile station, subscriber station, portable electronic device, mobile communications device, wireless modem, wireless terminal, or other electronic device. Examples of a mobile device may include a cellular phone, personal data assistant (PDA), smart phone, laptop, tablet, personal computer (PC), pager, portable computer, portable gaming device, wearable electronic device, health/medical/fitness device, camera, or other mobile communications device having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

FIG. 2 is a flow diagram showing an example process 200 for establishing a trust relationship between an infrastructure service server and an EMM server according to an implementation. The process 200 can be implemented by one or more entities shown in FIG. 1, or any other systems or modules that establish secure communication channels. For example, the process 200 can be implemented by a security server 202, an infrastructure service (IS) security server 204, an IS server 206, a credential broker 208, an EMM server 210, or a combination thereof. The example process 200, shown in FIG. 2, can also be implemented using additional, fewer, or different operations, which can be performed in the order shown or in a different order. For example, as discussed previously, in some cases, the EMM server 210 can communicate with other entities, e.g., the credential broker 208 or the IS server 206 through an EMM service router.

The example process 200 begins at 220, where the EMM server 210 sends a request for an authentication credential associated with the IS server 206 to the credential broker 208. In some cases, the authentication credential can be a challenge password. In some cases, the request can include information for authenticating the EMM server 210. For example, the request can include an identifier, an authentication key, an organization ID or other information associated with the EMM server 210. In some cases, the request can be a getChallengePassword message.

At 225, the credential broker 208 authenticates the EMM server 210. In some cases, the credential broker 208 can use the information received at 220 to perform authentication. In one example, the credential broker 208 can send an authentication request to the security server 202. The authentication request can include the identifier of the EMM server 210, the authentication key of the EMM server 210, the organization ID of the EMM server 210, or a combination thereof. The security server 202 can perform the authentication based on the information and send an authentication response to the credential broker 208.

If the authentication at 225 is successful, at 230, the credential broker 208 obtains the authentication credential from the IS security server 204. In some cases, the credential broker 208 can send a request for the authentication credential to the IS security server 204. In some cases, because the credential broker 208 has authenticated the EMM server 210 at 225, the request can omit the information for authenticating the EMM server 210. For example, the request can omit the identifier of the EMM server 210, the authentication key of the EMM server 210, and the organization ID of the EMM server 210. In response, the IS security server 204 can generate the authentication credential. In some cases, the authentication credential, e.g., the challenge password, can be generated using a random function. The IS security server 204 can send the authentication credential to the credential broker 208. In one example, the request can be sent using a getChallengePassword message.

At 235, the credential broker 208 sends the authentication credential to the EMM server 210.

At 240, the EMM server 210 sends a request for a client certificate of the EMM server 210 to the IS security server 204. The request for the client certificate can include the authentication credential, e.g., the challenge password. In some cases, the request for the client certificate can be sent using a Simple Certificate Enrollment Protocol (SCEP) message, e.g., a GetCA message.

At 245, the IS security server 204 generates and signs a client certificate, and sends the client certificate to the EMM server 210. The client certificate can be used by the EMM server 210 to request service to the IS server 206. In some cases, the client certificate can include the identifier of the EMM server 210, the organization ID of the EMM server 210, a string that represent the name of the EMM server 210, or a combination thereof. In some cases, the identifier of the EMM server 210 can be a tenant identifier of the EMM server 210. In some cases, the client certificate also includes the root certificate that was used to the IS server 206 use to sign its server certificate.

At 250, the EMM server 210 sends a registration request to the IS server 206. The registration request can include the client certificate received at 245. The client certificate can be used to validate the EMM server 210. The registration request also includes the identifier of the EMM server 210. In some cases, the registration request also includes capability information of the EMM server 210, for example, a list of infrastructure service capabilities that the EMM server 210 supports.

In some cases, the registration request can also include additional certificates that can be used to send information in a reverse direction. The additional certificates can include a root certificate, an intermediate certificate, or a combination thereof that are issued by CAs associated with the EMM server 210. The IS server 206 can use the additional certificates to validate the certificate received from the EMM server 210 when establish a secured communication channel, e.g., a TLS channel for sending requests from the IS server 206 to the EMM server 210.

In some cases, the registration request also includes the routing information of the EMM server 210. The routing information can be used by other entities to send messages to the EMM server 210. For example, the physical topology of the EMM server 210 can be obscured by an EMM service router. Therefore, an entity, e.g., the IS server 206, can include the routing information in the message directed to the EMM server 210 and send the message to the EMM service router. The routing information can indicate the physical components or an internal address of the EMM server 210 and the EMM service router can use the routing information to forward the message to the EMM server 210. In some cases, the registration request can be formatted according to the System for Cross-domain Identity Management (SCIM) protocol.

At 255, the IS server 206 validates the client certificate. If the client certificate validates, the EMM server 210 is registered with the IS server 206. In some cases, the IS server 206 can create a tenant for the EMM server 210 and assign a tenant ID to the EMM server 210. The tenant ID can be used to represent the EMM server 210 when communicating with the IS server 206. The IS server 206 can send the tenant ID to the EMM server 210.

At this point, the EMM server 210 has registered with the IS server 206 and the IS server 206 can send an authentication request to the EMM server 210 using the routing information received at 250. In some cases, the IS server 206 can use the certificates received at 250 to establish a mutual authentication channel, e.g., a TLS connection, with the EMM server 210. In this direction, the EMM server 210 can act as a server and the IS server 206 can act as a client, and request a client certificate.

Figure 3:
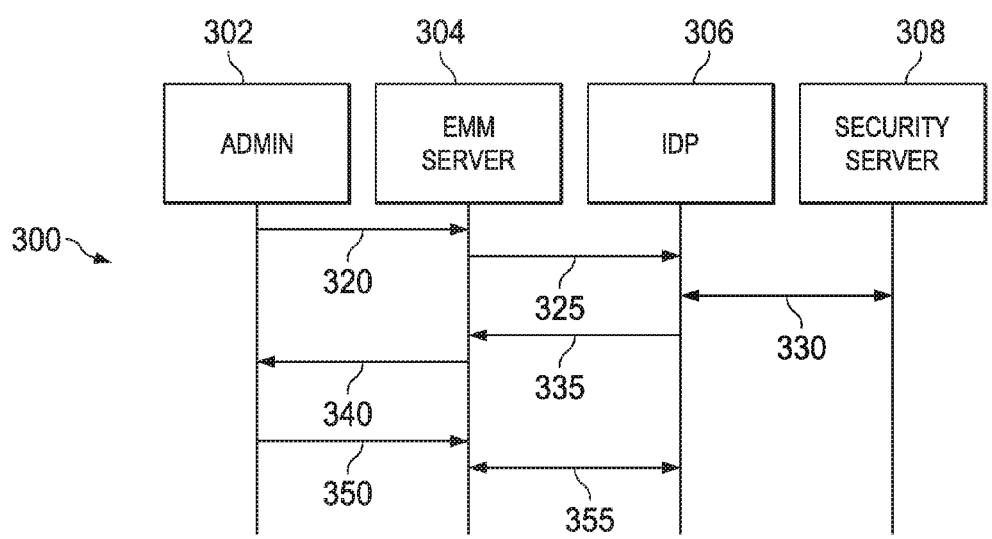
FIG. 3 is a flow diagram showing an example process for provisioning an enterprise service at an IDP according to an implementation.
Figure 4:
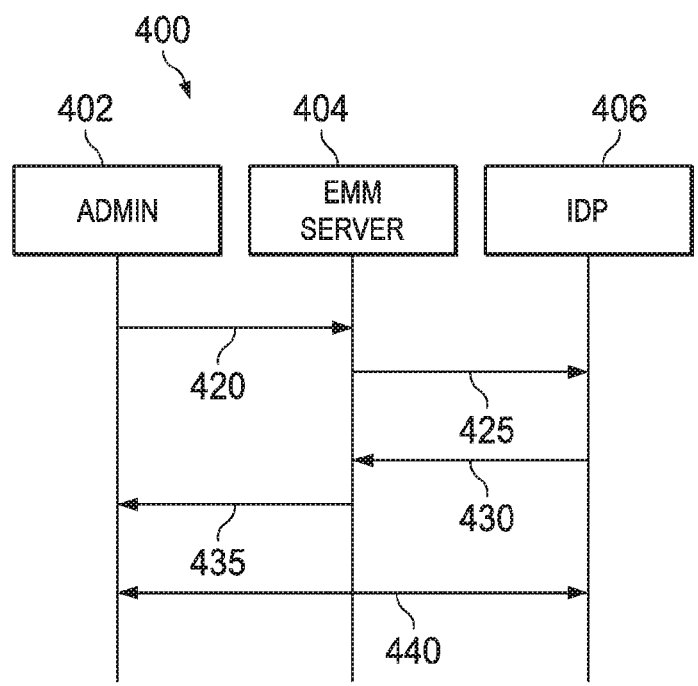
FIG. 4 is a flow diagram showing an example process for provisioning an enterprise service at an IDP according to a different implementation.

At 260, the EMM server 210 sends a client certificate for the IS server 206 to the IS server 206. In some cases, the client certificate for the IS server 206 can be sent in accordance with the SCIM protocol. At this point, the EMM server 210 and the IS server 206 established a trust relationship. The EMM server 210 can use its client certificate to establish a secure communication channel when requesting service from the IS server 206. For example, the EMM server 210 can use its client certificate to provision enterprise services at the IS server 206. FIGS. 3-4 and associated descriptions provide additional details of these implementations. In addition, the IS server 206 can use its client certificate to establish a secure communication channel when requesting services from the EMM server. For example, the IS server 206 can use its client certificate to request the EMM server to authenticate a user for an enterprise service. FIG. 5 and associated descriptions provide additional details of these implementations.

In some cases, the established trust relationship between the EMM server and the IDP can be used to enable an administrator to provision a service at the IDP through the EMM server. FIG. 3 is a flow diagram showing an example process 300 for provisioning an enterprise service at an IDP according to an implementation. The process 300 can be implemented by one or more entities shown in FIG. 1, or any other systems or modules that provision the enterprise service. For example, the process 300 can be implemented by an administrator 302, an EMM server 304, an IDP 306, and a security server 308, or a combination thereof. The example process 300, shown in FIG. 3, can also be implemented using additional, fewer, or different operations, which can be performed in the order shown or in a different order. For example, as discussed previously, in some cases, the EMM server 304 can communicate with other entities through an EMM service router.

The IDP 306 represents an application, set of applications, software, software modules, hardware, or combination thereof that can be configured to validate an entity for accessing an enterprise resource. In some cases, the IDP 306 can also be referred to as an Identity Assertion Provider. In some cases, the IDP 306 can validate a user that requests to access the enterprise service. The IDP 306 can also assert to a service provider that the application is authenticated. In some cases, the IDP 306 can also validate a user or an electronic device associated with the requests. FIG. 5 and associated descriptions provide additional details of these implementations.

The security server 308 represents an application, set of applications, software, software modules, hardware, or combination thereof that can be configured to authenticate whether the EMM server 304 is authorized to provision an enterprise service. In some cases, the security server 308 can be implemented using an AAA server.

The example process 300 begins at 320, where the administrator 302 sends a provisioning request to the EMM server 304. In one example, the administrator 302 can click a link on a browser to provision an enterprise service. The browser can send an HTTP message to the EMM server 304. The HTTP message can indicate the provisioning request.

In some cases, the provisioning request can identify the enterprise service to be provisioned. In some cases, the provisioning request can indicate that more than one enterprise services are requested to be provisioned. In one example, the EMM server 304 can be configured to provision more than one enterprise service for the enterprise. In this example, the provisioning request can request the EMM server 304 to provision all the enterprise services that the EMM server 304 is configured to provision.

At 325, the EMM server 304 sends a service request to the IDP 306 to request a provision of the enterprise service at the IDP 306. In some cases, the service request can be sent using an API function call. The service request includes the tenant ID representing the EMM server 304. As described previously in associated with FIG. 2, the tenant ID was assigned by the IDP 306 for the EMM server 304 during the registration process. In some cases, the service request can also include the organization ID of the EMM server 304. In some cases, the service request is sent to the IDP 306 using a secured communication channel in accordance with a security protocol, e.g., the Transport Layer Security (TLS) protocol. In some cases, the client certificate for the EMM server 304 discussed previously is used in establishing the secured communication channel. For example, the client certificate for the EMM server 304 can be included in a handshake procedure of the security protocol. The EMM server 304 can validate the client certificate to authenticate the EMM server 304.

In some cases, the IDP 306 can consult with the security server 308 to determine the enterprise services that the EMM server 304 is authorized to provision. In some cases, the enterprise services that the EMM server 304 is authorized to provision can be determined based on the organization ID of the EMM server 304. The organization ID can indicate the enterprise associated with the EMM server 304. In these or other cases, at 330, the IDP 306 can send an authorization request to the security server 308. The authorization request can include the organization ID of the EMM server 304. The security server 308 can determine one or more services that the enterprise has subscribed based on the organization ID, and send an authorization response to indicate the services that the EMM server 304 is authorized to provision.

At 335, the IDP 306 sends a service response to the EMM server 304. The service response indicates one or more enterprise services that can be provisioned by the administrator 302. For example, the service response can include a list of enterprise services that can be managed by the EMM server 304. The administrator 302 can select one or more services in the list of services included in the service response, and provision the selected service on the EMM server 304. The provisioning can include assigning a user or a group of users to the selected service. The EMM server 304 provisions the one or more enterprise services at the EMM server 304. At 340, the EMM server 304 sends a response to the administrator 302 to indicate that the service has been provisioned at EMM server 304.

At 350, the administrator 302 sends a command to the EMM server 304 to provision one or more users for an enterprise service. In some cases, the one or more users can include employees, customers, or other business associates of the enterprise. In some cases, the command can identify one user to be provisioned. Alternatively or additionally, the command can identify a group of users to be provisioned. In some cases, the command can also indicate a request to update or delete a user's, or more than one users' provisioning of the enterprise service.

At 355, the EMM server 304 provisions the user at the IDP 306. In some cases, the EMM server 304 can send a user provisioning request to the IDP 306. The provisioning request includes one or more user identity attributes, one or more user entitlement attributes, or a combination thereof. In some cases, the user identity attributes can include a user ID, a username, an email address of the user, a domain name of the user, a user type, or a combination thereof. The user entitlement attributes can include information related to the enterprise services that the user is entitled to use. For example, the user entitlement attributes can indicate if the user is authorized to use one or more enterprise services. The user entitlement attributes can also include the access level for the user with respect to the enterprise service, e.g., whether the user is authorized to access a particular portion or types of resources associated with an enterprise service.

In some cases, the EMM server 304 can access a database to obtain the user identity attributes and the user entitlement attributes. The database can be implemented on the same platform as the EMM server 304, or a different platform that is communicatively coupled with the EMM server 304. The IDP 306 can provision the user based on the user identity attribute and the user entitlement attribute. The IDP 306 can send a user provisioning response to the EMM server 304 to indicate that the user has been provisioned.

In some cases, the EMM server 304 can consult with a license management server, e.g., a Holistic Engineering and License Management (HELM) server, to determine the number of the licenses available for a particular service. For example, if a group of users are provisioned, the EMM server 304 can consult with the license management server to determine if there are enough licenses for provisioning the group of the users. The EMM server 304 can also report to the license management server on the number of user licenses that have been consumed by the provisioning operations. The license management server can be implemented on the same or different hardware platform as the security server 308.

In some cases, the EMM server 304 and the IDP 306 can use SCIM messages for sending the user provisioning request and response. For example, the user provisioning request can be a SCIM Patch message, and the user provisioning response can be a SCIM response message. In some cases, e.g., if a group of users are provisioned, the EMM server 304 can send the user provisioning request for each user in the group. This approach can limit the size of the user provisioning request. In some cases, more than one users can be provisioned using one user provisioning request. In some cases, the user provisioning request and response messages are sent using a secured communication channel in accordance with a security protocol, e.g., the Transport Layer Security (TLS) protocol. In some cases, the client certificates for the EMM server 304 and the IDP 306 discussed previously are used in establishing the secured communication channel, e.g., the client certificates can be included in a handshake procedure of the security protocol for mutual authentication.

In some cases, the EMM server 304 can be configured to perform one or more authentication functions for the IDP 306. For example, the EMM server 304 can be configured to perform password and multi-factor authentication for a provisioned user that requests the enterprise service. The administrator 302 can configure the authentication policies, e.g., the types of the authentication required or the division of labor between the EMM server 304 or the IDP 306 in performing the authentication functions, associated with an enterprise service during the provisioning procedure discussed above.

In some cases, the established trust relationship between the EMM server and the IDP can be used to send a temporary access credential from the IDP server to the EMM server. The EMM server can provide the temporary access credential to an administrator for provisioning a service at the IDP. FIG. 4 is a flow diagram showing an example process 400 for provisioning an enterprise service at an IDP according to a different implementation. The process 400 can be implemented by one or more entities shown in FIG. 1, or any other systems or modules that provision the enterprise service. For example, the process 400 can be implemented by an administrator 402, an EMM server 404, an IDP 406, or a combination thereof. The example process 400, shown in FIG. 4, can also be implemented using additional, fewer, or different operations, which can be performed in the order shown or in a different order. For example, as discussed previously, in some cases, the EMM server 404 can communicate with other entities through an EMM service router.

The example process 400 begins at 420, where the administrator 402 sends a provisioning request to the EMM server 404. The provisioning request can be sent through a browser, an application interface, or any other user interface that the administrator 402 can use to access the EMM server 404.

At 425, the EMM server 404 sends a request for a temporary access credential to the IDP 406. In some cases, the temporary access credential can include a one-time-password for the administrator 402. In some cases, the request is sent using a secured communication channel in accordance with a security protocol, e.g., the Transport Layer Security (TLS) protocol. In some cases, the client certificate of the EMM server 304 discussed previously is used in establishing the secured communication channel, e.g., the client certificates can be included in a handshake procedure of the security protocol for authentication. In some cases, the IDP 406 can authenticate the EMM server 404 based on the information included in the client certificate, e.g., the identifier of the EMM server 404.

At 430, the IDP 406 generates the temporary access credential and sends the temporary access credential to the EMM server 404. In some cases, the temporary access can be a string that is generated using a random function. In some cases, the IDP 406 can set a timer associated with the temporary access credential. The temporary access credential will be invalid when the timer expires. In some cases, the temporary access credential will also be invalid if it has been used once.

At 435, the EMM server 404 sends the temporary access credential to the administrator 402. In some cases, the EMM server can create a login Uniform Resource Locator (URL) that points to the IDP 406. The EMM server 404 can send the URL and the temporary access credential to the administrator 402.

At 440, the administrator 402 uses the temporary access credential to access the IDP 406. In some cases, the user interface that the administrator 402 uses to access the EMM server 404, e.g., a browser, can receive the URL and the temporary access credential from the EMM server 404 and automatically redirect to the IDP 406 using the URL. The user interface can also be configured to automatically send the temporary access credential to the IDP 406 without user interactions from the administrator 402. The IDP 406 can validate the administrator 402 based on the temporary access credential. After the administrator 402 is validated, the administrator 402 can proceed to provision enterprise services at the IDP 406. For example, the administrator 402 can provision user identity attributes and user entitlement attributes associated with one or more users for an enterprise service at the IDP 406. This approach provides one or more advantages. For example, because the IDP 406 sends the temporary access credential to a trusted EMM server, the IDP 406 can authenticate the administrator 402 based on the temporary access credential instead of authenticating the administrator 402 based on the identity information of the administrator 402. Furthermore, the user interface at the administrator 402 can be configured to send the temporary access credential without user interactions. Therefore, the authentication procedure can be simplified for both the IDP 406 and the administrator 402.

FIG. 5 is a flow diagram showing an example process 500 for a user to access an enterprise service according to an implementation. The process 500 can be implemented by one or more entities shown in FIG. 1, or any other systems or modules that provision the enterprise service. For example, the process 500 can be implemented by a user 502, a service provider 504, an IDP 506, and an EMM server 508, or a combination thereof. The example process 500, shown in FIG. 3, can also be implemented using additional, fewer, or different operations, which can be performed in the order shown or in a different order. For example, as discussed previously, in some cases, the EMM server 508 can communicate with other entities through an EMM service router. In some cases, the user 502 can communicate with other entities through a user interface provided by a client application, e.g., a browser or an enterprise service client, operating on an electronic device.

The example process 500 begins at 520, where the user 502 sends an access request for an enterprise service to the service provider 504. In some cases, the access request is sent through a browser or an enterprise service client operating on an electronic device. In some cases, the access request can be a Simple Object Access Protocol (SOAP) message or a Hypertext Transfer Protocol (HTTP) Representational State Transfer (REST) message.

At 525, in response to the access request, the service provider 504 sends an authentication request to the user 502. In some cases, the authentication request directs the user 502 to be authenticated at the IDP 506 before the access to the enterprise service can be granted.

At 530, the authentication request is forwarded to the IDP 506. In some cases, the client application, e.g., the browser or the enterprise service client operating on the electronic device used by the user 502, can be configured to redirect to the IDP 506 and send the authentication request. In some cases, the user 502 can log onto the IDP 506 and provide login credentials, e.g., username and password, after the client application is redirected to the IDP 506.

At 535, the IDP 506 sends a user authentication request to the EMM server 508. The user authentication request includes the login credentials provided by the user 502. In some cases, user authentication request can be sent using a secured communication channel in accordance with a security protocol, e.g., the Transport Layer Security (TLS) protocol. In some cases, the client certificate of the IDP 506 discussed previously can be used in establishing the secured communication channel, e.g., the client certificate can be included in a handshake procedure of the security protocol for authentication. In some cases, the EMM server 508 can authenticate the IDP 506 based on the client certificate.

At 540, the EMM server 508 can authenticate the user 502 based on the login credentials and send a user authentication response to the IDP 506. In some cases, the EMM server 508 can consult an active directory to determine whether the user 502 is authorized for the requested service. In some cases, the active directory can be implemented using a database that stores information associated with authorized users, e.g., current employees, customers, or other business associates of the enterprise.

If the user authentication response indicates that the EMM server 508 has authenticated the user 502, the IDP 506 can further check the entitlement information associated with the user 502 discussed previously in association with FIGS. 3-4. For example, the IDP 506 can determine whether the user 502 is authorized to access the service based on the user entitlement attributes that have been provisioned at IDP 506.

At 545, the IDP 506 sends an authentication response to the user 602. The authentication response indicates whether the user 502 is authenticated. In some cases, the authentication response can include an authorization token. The authorization token can include an authentication status. The authentication status can indicate whether the authentication succeeds or fails. In some cases, the authorization token can be signed with a private key of the IDP 506. In some cases, the authentication token can be formatted as a Security Assertion Markup Language (SAML) assertion or an OpenID Connect ID Token.

At 560, the user 502 communicates with the service provider 504 to access the enterprise service. In some cases, the user 502 can send the authentication token to the service provider 504. In some cases, the authentication token can be sent using a post command. The service provider 504 can determine whether the user 502 is authorized to access the enterprise service based on the authentication status in the authorization token. In some cases, as discussed previously, the authorization token may be signed with a private key of the IDP 506. In these or other cases, the service provider 504 can use the public key of the IDP 506 to validate the signature on the authorization token. If the authentication status indicates that the authentication is successful, the service provider 504 can provide the enterprise service to the user 502.

Figure 6:
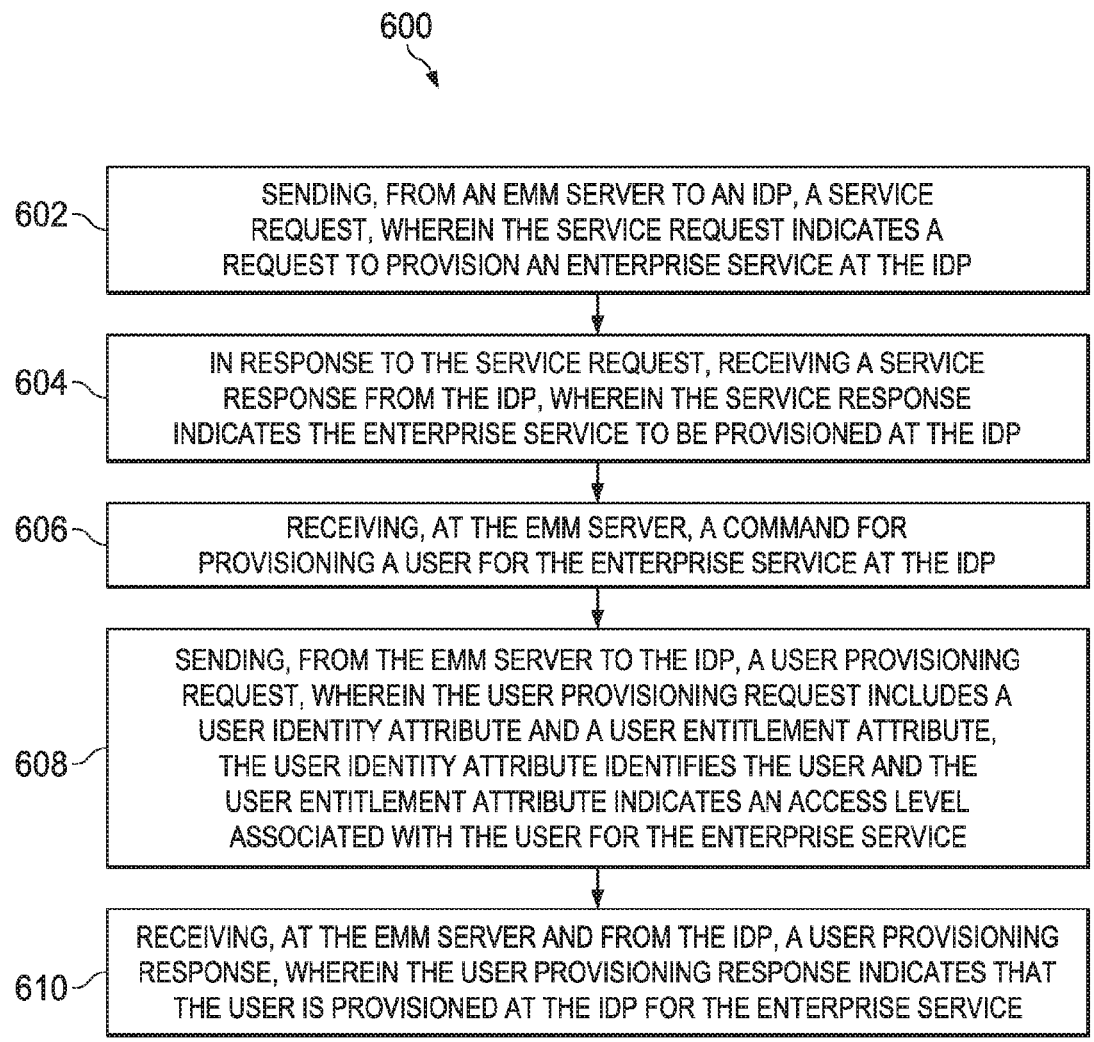
FIG. 6 is a flow diagram showing an example method for provisioning an enterprise service according to an implementation.

FIG. 6 is a flow diagram showing an example method 600 for provisioning an enterprise service according to an implementation. The method 600 can be implemented by an EMM server, e.g., the EMM server 140 shown in FIG. 1. The method 600 shown in FIG. 6 can also be implemented using additional, fewer, or different entities. Furthermore, the method 600 shown in FIG. 6 can also be implemented using additional, fewer, or different operations, which can be performed in the order shown or in a different order.

The example method 600 begins at 602, where a service request is sent from an EMM server to an IDP. The service request indicates a request to provision an enterprise service at the IDP. At 604, in response to the service request, the EMM server receives a service response from the IDP. The service response indicates the enterprise service to be provisioned at the IDP. At 606, the EMM server receives a command for provisioning a user for the enterprise service at the IDP. At 608, from the EMM server sends a user provisioning request to the IDP. The user provisioning request includes a user identity attribute and a user entitlement attribute. The user identity attribute identifies the user, and the user entitlement attribute indicates an access level associated with the user for the enterprise service. For example, the user provisioning request can include the email address, the first and last names of the user, or any other information associated with the user. At 610, the EMM server receives a user provisioning response from the IDP. The user provisioning response indicates that the user is provisioned at the IDP for the enterprise service.

Figure 7:
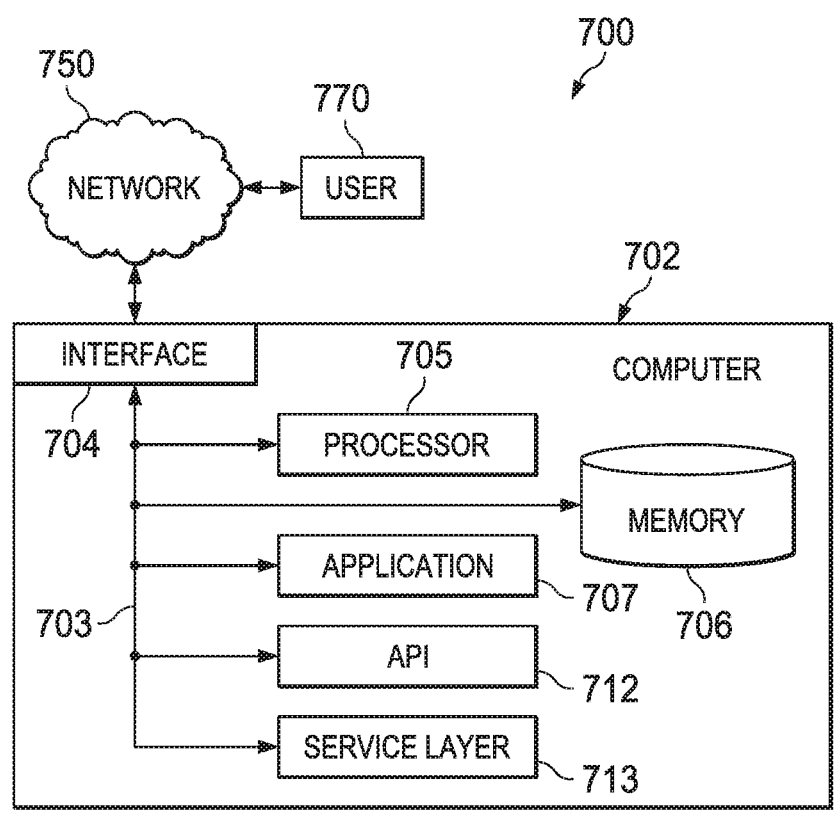
FIG. 7 is a high-level architecture block diagram of a service provisioning computing system according to an implementation.

FIG. 7 is a high-level architecture block diagram of a service provisioning computing system 700 according to an implementation. At a high level, the illustrated system 700 includes a user 770 that is communicably coupled with a service provisioning computer 702 through a network 750. The described illustration is only one possible implementation of the described subject matter and is not intended to limit the disclosure to the single described implementation. Those of ordinary skill in the art will appreciate the fact that the described components can be connected, combined, or used in alternative ways consistent with this disclosure.

The user 770 represents an application, a set of applications, software, software modules, hardware, or combination thereof that can use the service provisioning computing system 700 to provision service. For example, the user 770 can be an administrator, e.g., the administrator 142, or a user, e.g., the user 102.

The network 750 facilitates communications between the components of the system 700. In some cases, the user 770 can access the computer 702 from a remote network. In these or other cases, the network 750 can be a wireless or a wireline network. In some cases, the user 770 can access the computer 702 locally. In these or other cases, the network 750 can also be a memory pipe, a hardware connection, or any internal or external communication paths between the components.

The computer 702 includes a computing system configured to provision service. For example, the computer 702 can be included in an EMM server, e.g., the EMM server 140, an infrastructure service server, e.g., the infrastructure service server 122, or other entities in the system 100, to perform the algorithm described in this disclosure. In some cases, the algorithm can be implemented in an executable computing code, e.g., C/C++ executable codes. Alternatively or in combination, the algorithm can be implemented in an application program, e.g., EXCEL. In some cases, the computer 702 can include a standalone Linux system that runs batch applications. In some cases, the computer 702 can include mobile or personal computers that run the application program.

The computer 702 may include an input device, such as a keypad, keyboard, touch screen, microphone, speech recognition device, other device that can accept user information, and/or an output device that conveys information associated with the operation of the computer 702, including digital data, visual and/or audio information, or a GUI.

The computer 702 can serve as a client, network component, a server, a database or other persistency, and/or any other component of the system 700. In some implementations, one or more components of the computer 702 may be configured to operate within a cloud-computing-based environment.

At a high level, the computer 702 is an electronic computing device operable to receive, transmit, process, store, or manage data and information associated with the system 700. According to some implementations, the computer 702 may also include or be communicably coupled with an application server, e-mail server, web server, caching server, streaming data server, business intelligence (BI) server, and/or other server.

The computer 702 can receive requests over network 750 from a client application (e.g., executing on another computer 702) and respond to the received requests by processing the said requests in an appropriate software application. In addition, requests may also be sent to the computer 702 from internal users (e.g., from a command console or by another appropriate access method), external or third parties, other automated applications, as well as any other appropriate entities, individuals, systems, or computers.

Each of the components of the computer 702 can communicate using a system bus 703. In some implementations, any and/or all the components of the computer 702, both hardware and/or software, may interface with each other and/or the interface 704 over the system bus 703 using an application programming interface (API) 712 and/or a service layer 713. The API 712 may include specifications for routines, data structures, and object classes. The API 712 may be either computer language-independent or -dependent and refer to a complete interface, a single function, or even a set of APIs. The service layer 713 provides software services to the computer 702 and/or the system 700. The functionality of the computer 702 may be accessible for all service consumers using this service layer. Software services, such as those provided by the service layer 713, provide reusable, defined business functionalities through a defined interface. For example, the interface may be software written in JAVA, C++, or other suitable language providing data in Extensible Markup Language (XML) format or other suitable format. While illustrated as an integrated component of the computer 702, alternative implementations may illustrate the API 712 and/or the service layer 713 as stand-alone components in relation to other components of the computer 702. Moreover, any or all parts of the API 512 and/or the service layer 713 may be implemented as child or sub-modules of another software module, enterprise application, or hardware module without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems in a distributed environment—including within the system 700—connected to the network 750—(whether illustrated or not). Generally, the interface 704 comprises logic encoded in software and/or hardware in a suitable combination and operable to communicate with the network 750. More specifically, the interface 704 may comprise software supporting one or more communication protocols associated with communications such that the network 750 or interface's hardware is operable to communicate physical signals within and outside of the illustrated system 700.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702. Specifically, the processor 705 executes the functionality required for provisioning enterprise services. In some cases, the processor 705 can include a data processing apparatus.

The computer 702 also includes a memory 706 that holds data for the computer 702. Although illustrated as a single memory 706 in FIG. 7, two or more memories may be used according to particular needs, desires, or particular implementations of the computer 702. While memory 706 is illustrated as an integral component of the computer 702, in alternative implementations, memory 706 can be external to the computer 702.

The application 707 is an algorithmic software engine providing functionality according to particular needs, desires, or particular implementations of the computer 702, particularly with respect to functionality required for provisioning enterprise service. Although illustrated as a single application 707, the application 707 may be implemented as multiple applications 707 on the computer 702. In addition, although illustrated as integral to the computer 702, in alternative implementations, the application 707 can be external to the computer 702.

There may be any number of computers 702 associated with, or external to, the system 700 and communicating over network 750. Further, the terms "client," "user," and other appropriate terminology may be used interchangeably, as appropriate without departing from the scope of this disclosure. Moreover, this disclosure contemplates that many users may use one computer 702, or that one user may use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A method, comprising:
receiving, at an enterprise mobility management (EMM) server, a first client certificate;
sending a registration request to an identity provider (IDP), wherein the registration request includes the first client certificate and security credential of the EMM server, and the IDP uses the first client certificate to authenticate the EMM server;
receiving, from the IDP, a request for a second client certificate, wherein the second client certificate will be used to authenticate the IDP at the EMM server in subsequent communications, and the request for the second client certificate includes the security credential of the EMM server;
sending the second client certificate to the IDP;
using a trust relationship between the IDP and the EMM server to establish a secure communication channel;
receiving, at the EMM server, a command for provisioning a user for an enterprise service at the IDP;
sending, from the EMM server to the IDP, a user provisioning request by using the secure communication channel, wherein the user provisioning request includes a user identity attribute and a user entitlement attribute, the user identity attribute identifies the user, and the user entitlement attribute indicates an access level associated with the user for the enterprise service; and
receiving, in response to the user provisioning request, at the EMM server and from the IDP, a user provisioning response by using the secure communication channel, wherein the user provisioning response indicates that the user is provisioned at the IDP for the enterprise service.

2. The method of claim 1, further comprising:
sending, from the EMM server to the IDP, a service request, wherein the service request indicates a request to provision the enterprise service at the IDP; and
in response to the service request, receiving a service response from the IDP, wherein the service response indicates the enterprise service to be provisioned at the IDP.

3. The method of claim 1, wherein the user provisioning request is sent using a System for Cross-domain Identity Management (SCIM) message.

4. The method of claim 1, further comprising:
obtaining, at the EMM server, the user identity attribute and the user entitlement attribute associated with the user; and
including the user identity attribute and the user entitlement attribute in the user provisioning request.

5. The method of claim 1, further comprising:
sending a challenge password to an infrastructure server that is associated with the IDP; and
receiving the first client certificate in response to the challenge password.

6. An enterprise mobility management (EMM) server, comprising:
a memory; and
at least one hardware processor communicatively coupled with the memory and configured to:

receiving, at the EMM server, a first client certificate;

sending a registration request to an identity provider (IDP), wherein the registration request includes the first client certificate and security credential of the EMM server, and the IDP uses the first client certificate to authenticate the EMM server;

receiving, from the IDP, a request for a second client certificate, wherein the second client certificate will be used to authenticate the IDP at the EMM server in subsequent communications, and the request for the second client certificate includes the security credential of the EMM server;

sending the second client certificate to the IDP;

using a trust relationship between the IDP and the EMM server to establish a secure communication channel;

receive, at the EMM server, a command for provisioning a user for an enterprise service at the IDP;

send, from the EMM server to the IDP, a user provisioning request by using the secure communication channel, wherein the user provisioning request includes a user identity attribute and a user entitlement attribute, the user identity attribute identifies the user, and the user entitlement attribute indicates an access level associated with the user for the enterprise service; and receive, in response to the user provisioning request, at the EMM server and from the IDP, a user provisioning response by using the secure communication channel, wherein the user provisioning response indicates that the user is provisioned at the IDP for the enterprise service.

7. The EMM server of claim 6, wherein the at least one hardware processor is configured to:

send, from the EMM server to the IDP, a service request, wherein the service request indicates a request to provision the enterprise service at the IDP; and in response to the service request, receive a service response from the IDP, wherein the service response indicates the enterprise service to be provisioned at the IDP.

8. The EMM server of claim 6, wherein the user provisioning request is sent using a System for Cross-domain Identity Management (SCIM) message.

9. The EMM server of claim 6, wherein the at least one hardware processor is configured to:

obtain, at the EMM server, the user identity attribute and the user entitlement attribute associated with the user; and include the user identity attribute and the user entitlement attribute in the user provisioning request.

10. The EMM server of claim 6, wherein the at least one hardware processor is configured to:

send a challenge password to an infrastructure server that is associated with the IDP; and receive the first client certificate in response to the challenge password.

11. A non-transitory computer-readable medium containing instructions which, when executed, cause a computing device to perform operations comprising:

receiving, at an enterprise mobility management (EMM) server, a first client certificate;

sending a registration request to an identity provider (IDP), wherein the registration request includes the first client certificate and security credential of the EMM server, and the IDP uses the first client certificate to authenticate the EMM server;

receiving, from the IDP, a request for a second client certificate, wherein the second client certificate will be used to authenticate the IDP at the EMM server in subsequent communications, and the request for the second client certificate includes the security credential of the EMM server;

sending the second client certificate to the IDP;

using a trust relationship between the IDP and the EMM server to establish a secure communication channel;

receiving, at the EMM server, a command for provisioning a user for an enterprise service at the IDP;

sending, from the EMM server to the IDP, a user provisioning request by using the secure communication channel, wherein the user provisioning request includes a user identity attribute and a user entitlement attribute, the user identity attribute identifies the user, and the user entitlement attribute indicates an access level associated with the user for the enterprise service; and receiving, in response to the user provisioning request, at the EMM server and from the IDP, a user provisioning response by using the secure communication channel, wherein the user provisioning response indicates that the user is provisioned at the IDP for the enterprise service.

12. The non-transitory computer-readable medium of claim 11, the operations further comprising:

sending, from the EMM server to the IDP, a service request, wherein the service request indicates a request to provision the enterprise service at the IDP; and in response to the service request, receiving a service response from the IDP, wherein the service response indicates the enterprise service to be provisioned at the IDP.

13. The non-transitory computer-readable medium of claim 11, wherein the user provisioning request is sent using a System for Cross-domain Identity Management (SCIM) message.

14. The non-transitory computer-readable medium of claim 11, the operations further comprising:

obtaining, at the EMM server, the user identity attribute and the user entitlement attribute associated with the user; and including the user identity attribute and the user entitlement attribute in the user provisioning request.

\* \* \* \* \*